US012608477B2

(12) United States Patent
    Hsieh

(10) Patent No.:  US 12,608,477 B2
(45) Date of Patent:       Apr. 21, 2026

(54) MICRO-CONTROLLER AND MANAGEMENT METHOD FOR EXECUTING ON-THE-AIR (OTA) UPDATED FIRMWARE

(71) Applicant: Nuvoton Technology Corporation, Hsinchu Science Park (TW)

(72) Inventor: Chung-Hsiang Hsieh, Kaohsiung City (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 150 days.

(21) Appl. No.: 18/401,461

(22) Filed: Dec. 30, 2023

(65) Prior Publication Data

US 2025/0021655 A1      Jan. 16, 2025

(30) Foreign Application Priority Data

Jul. 12, 2023    (TW) .................................. 112125992

(51) Int. Cl.
    *G06F 21/57*             (2013.01)
(52) U.S. Cl.
    CPC .................................. *G06F 21/572* (2013.01)
(58) Field of Classification Search
    CPC ... G06F 21/572; G06F 12/0873; G06F 13/404
    See application file for complete search history.

(56) References Cited

U.S. PATENT DOCUMENTS

| | | | |
|---|---|---|---|
| 2005/0144611 A1* | 6/2005 | Chen ................... | G06F 11/1433 |
| | | | 717/168 |
| 2011/0040960 A1* | 2/2011 | Deierling .............. | G06F 21/572 |
| | | | 711/163 |
| 2014/0366012 A1* | 12/2014 | Jamadagni .............. | H04W 4/50 |
| | | | 717/171 |
| 2016/0232010 A1 | 8/2016 | Dicks et al. | |

(Continued)

FOREIGN PATENT DOCUMENTS

| | | |
|---|---|---|
| TW | 200404255 A | 3/2004 |
| TW | 200639706 A | 11/2006 |

(Continued)

OTHER PUBLICATIONS

An Office Action for TW Application No. 112125992, dated Aug. 22, 2024, 5 pages.

*Primary Examiner* — Hyun Soo Kim

(74) *Attorney, Agent, or Firm* — MUNCY, GEISSLER, OLDS & LOWE, P.C.

(57)                 ABSTRACT

A micro-controller for executing over-the-air updated firmware is provided to access an external memory. The external memory stores a first program code and a second program code. The micro-controller includes a bus, a control circuit, and a management circuit. The control circuit sends an access command to the bus. The management circuit receives an access command through the bus and reads a recorded value. In response to that the recorded value matches a preset value, the management circuit maps the first program code to a specific mapped memory space of a system memory space. In response to that the recorded value (Continued)

S311 — interpret an access command

S312 — read a recorded value

S313 — determine whether the recorded value matches a preset value?

No

Yes

S314 — map a first program code to the specific mapped memory space of the system memory space S315 — map a second program code to the specific mapped memory space of the system memory space does not match the preset value, the management circuit maps the second program code to the specific mapped memory space.

15 Claims, 4 Drawing Sheets

(56)            References Cited

U.S. PATENT DOCUMENTS

| | | |
|---|---|---|
| 2017/0249164 A1 | 8/2017 | Petkov et al. |
| 2017/0255567 A1* | 9/2017 | Vidyadhara ............. G06F 13/42 |
| 2020/0293662 A1* | 9/2020 | Gupta ...................... G06F 8/654 |
| 2021/0200532 A1* | 7/2021 | Shiu ........................ G06F 8/654 |
| 2022/0309195 A1* | 9/2022 | Yamaoka ............ G06F 21/6209 |
| 2025/0005160 A1* | 1/2025 | Jayaramareddy ..... G06F 21/575 |

FOREIGN PATENT DOCUMENTS

| | | |
|---|---|---|
| TW | 201807576 A | 3/2018 |
| TW | 202013181 A | 4/2020 |

* cited by examiner

MICRO-CONTROLLER AND MANAGEMENT METHOD FOR EXECUTING ON-THE-AIR (OTA) UPDATED FIRMWARE

CROSS REFERENCE TO RELATED APPLICATIONS

This application claims priority of Taiwan Patent Application 112125992, filed on Jul. 12, 2023, the entirety of which is incorporated by reference herein.

BACKGROUND OF THE INVENTION

Field of the Invention

The present invention relates to a micro-controller, in particular to a micro-controller for executing on-the-air (OTA) firmware update.

Description of the Related Art

In a bare-metal system (bare-metal system) or an operating system (OS) that does not support object code relocation, firmware (hereinafter referred to as F/W) must be addressed in a pre-planned execution address within compiling time. Although a position independent code/data technique of a compiler can be provided to prevent the above-mentioned addressing problem, the code size may be increased, and the execution time of programs may become longer.

BRIEF SUMMARY OF THE INVENTION

The invention provides an exemplary embodiment of a micro-controller for executing over-the-air updated firmware. The micro-controller is configured to access an external memory. The external memory stores a first program code and a second program code. The micro-controller comprises a bus, a control circuit, and a management circuit. The control circuit sends an access command to the bus. The management circuit receives an access command through the bus and reads a recorded value. In response to that the recorded value matches a preset value, the management circuit maps the first program code to a specific mapped memory space of a system memory space. In response to that the recorded value does not match the preset value, the management circuit maps the second program code to the specific mapped memory space.

The invention provides an exemplary embodiment of a management method for executing over-the-air updated firmware. The management method is performed to access an external memory. The external memory stores a first program code and a second program code. The management method comprises steps of interpreting an access command; reading a recorded value according to the access command; in response to that the recorded value matches a preset value, mapping the first program code to a specific mapped memory space of a system memory space; and in response to that the recorded value does not match the preset value, mapping the second program code to the specific mapped memory space.

The management method of the invention may be practiced by the systems of multi-dimensional measurement which have hardware or firmware capable of performing particular functions and may take the form of program code embodied in a tangible media. When the program code is loaded to and executed by an electronic device, a processor, a computer or a machine, the electronic device, the processor, the computer or the machine becomes a micro-controller for practicing the disclosed method.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
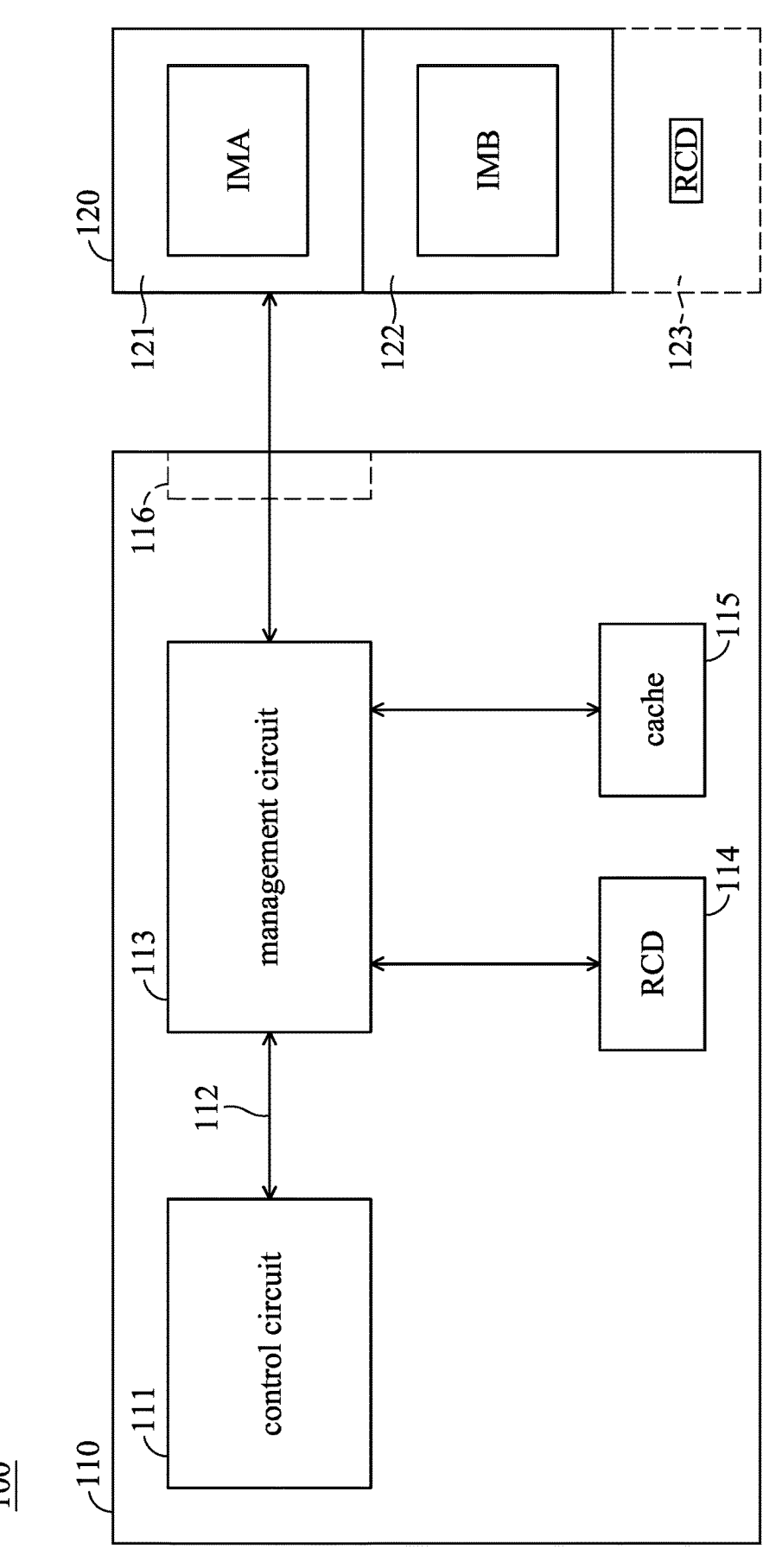
FIG. 1 is a schematic diagram showing an exemplary embodiment of an operating system.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram showing an exemplary embodiment of an operating system. An operating system 100 comprises a micro-controller (MCU) 110 and an external memory 120. As shown in FIG. 1, the external memory 120 is independent of the micro-controller 110. The present invention does not intend to limit the type of the external memory 120. In the embodiment, the external memory 120 is implemented by a non-volatile memory. For example, the external memory 120 is a flash memory.

The external memory 120 stores program codes IMA and IMB. The program codes IMA and IMB can be referred to as images. In a possible embodiment, the external memory 120 comprises memory blocks 121 and 122. The memory block 121 stores the program code IMA. The memory block 122 stores the program code IMB. In another possible embodiment, the program codes IMA and IMB are stored in the same memory block, such as the memory block 121. In this embodiment, the program code IMB is stored consecutively after the program code IMA. In some embodiments, one of the program codes IMA and IMB is a new-version program code, and the other one is an old-version program code.

The micro-controller 110 accesses the external memory 120 and executes an over-the-air updated firmware. In a possible embodiment, the micro-controller 110 comprises a control circuit 111, a bus 112, and a management circuit 113. The bus 112 is coupled between the control circuit 111 and the management circuit 113 and further responsible for data transmission between the control circuit 111 and the management circuit 113.

The control circuit 111 sends an access command to the bus 112. The present invention does not intend to limit the type of the control circuit 111. In a possible embodiment, the control circuit 111 is implemented by a central processing unit (CPU), a direct memory access (DMA) controller, or an encryption and decryption circuit.

The management circuit 113 receives the access commands through the bus 112. In a possible embodiment, the management circuit 113 interprets the access command to obtain an access address. When the access address points to the external memory 120, the management circuit 113 enters a direct memory mapping mode. In the direct memory mapped mode, the management circuit 113 reads a recorded value RCD and accesses the external memory 120 according to the recorded value RCD.

In a possible embodiment, the management circuit 113 compares the recorded value RCD with a preset value. When the recorded value RCD matches the preset value, the management circuit 113 maps the program code IMA to a specific mapped memory space of a system memory space. When the recorded value RCD does not match the preset value, the management circuit 113 maps the program code IMB to the specific mapped memory space.

The control circuit 111 executes program codes in the specific mapped memory space. Since the different program codes IMA and IMB of the external memory 120 are mapped to the same specific mapped memory space, the control circuit 111 can execute different program codes at the same execution address. For example, when the program code IMA is mapped to the specific mapped memory space, the control circuit 111 executes the program code IMA. When the program code IMB is mapped to the specific mapped memory space, the control circuit 111 executes the program code IMB.

The present invention does not intend to limit the storage location of the recorded value RCD. In a possible embodiment, the micro-controller 110 further comprises a memory 114. The memory 114 stores the recorded value RCD. In this embodiment, the memory 114 is implemented by a non-volatile memory. In another embodiment, the recorded value RCD is stored outside the micro-controller 110. For example, the recorded value RCD may be stored in the external memory 120. In this example, the external memory 120 comprises a memory block 123 for storing the recorded value RCD.

In some embodiments, the micro-controller 110 further comprises a cache 115. The cache 115 is provided to temporarily store the program code IMA or IMB from the external memory 120. Since parts of the program codes are stored in the micro-controller 110, the efficiency of the micro-controller 110 can be increased.

In other embodiments, the micro-controller 110 further comprises a transmission interface 116. The transmission interface 116 is coupled between the management circuit 113 and the external memory 120. In this case, the management circuit 113 accesses the external memory 120 through the transmission interface 116. In a possible embodiment, the management circuit 113 accesses the external memory 120 using a direct memory access (DMA) technique. The present invention does not intend to limit the type of the transmission interface 116. In a possible embodiment, the transmission interface 116 is implemented by a serial peripheral interface (SPI).

The present invention does not intend to limit the number of program codes in the external memory 120. The external memory 120 may store more program codes. In this example, different program codes represent updated files with different versions. It is assumed that the external memory 120 stores a first program code, a second program code, and a third program code. The first, second and third program codes may be stored in different memory blocks respectively or stored in the same memory block. In this example, when the recorded value RCD matches a first preset value, the management circuit 113 maps the first program code to a specific mapped memory space of a system memory space. When the recorded value RCD matches a second preset value, the management circuit 113 maps the second program code to the same specific mapped memory space. When the recorded value RCD matches a third preset value, the management circuit 113 maps the third program code to the same specific mapped memory space.

Figure 2A:
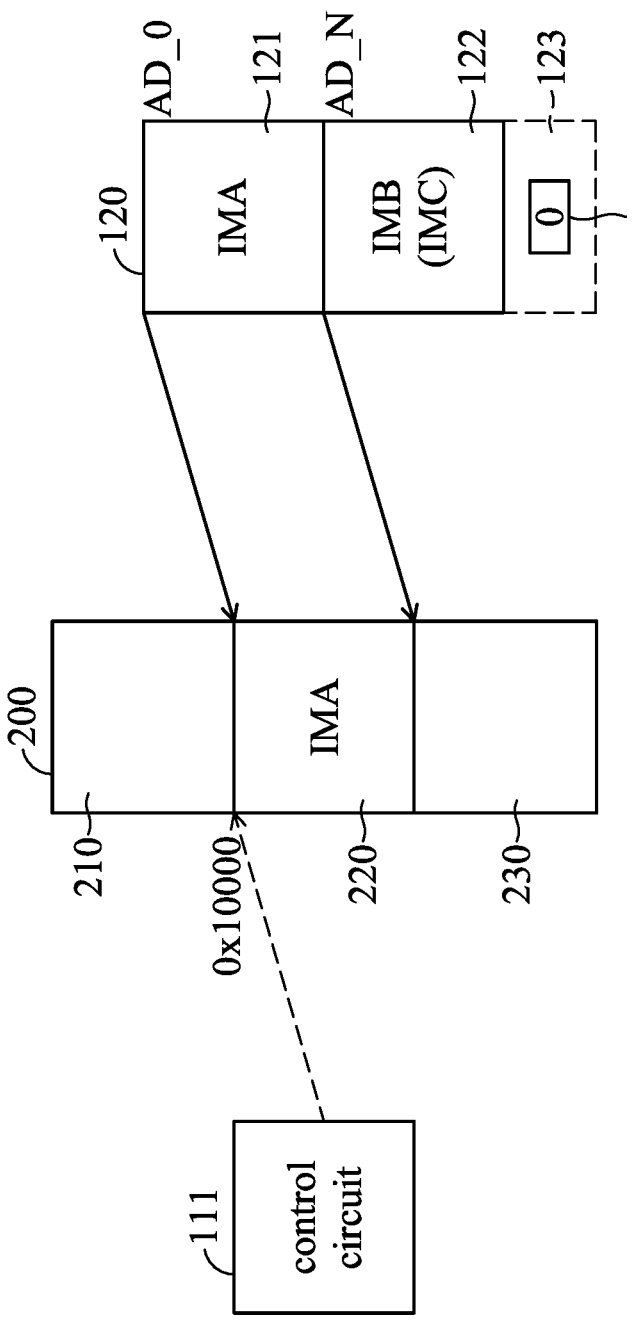
FIGS. 2A and 2B are schematic diagrams showing an exemplary embodiment of a system memory space.
Figure 2B:
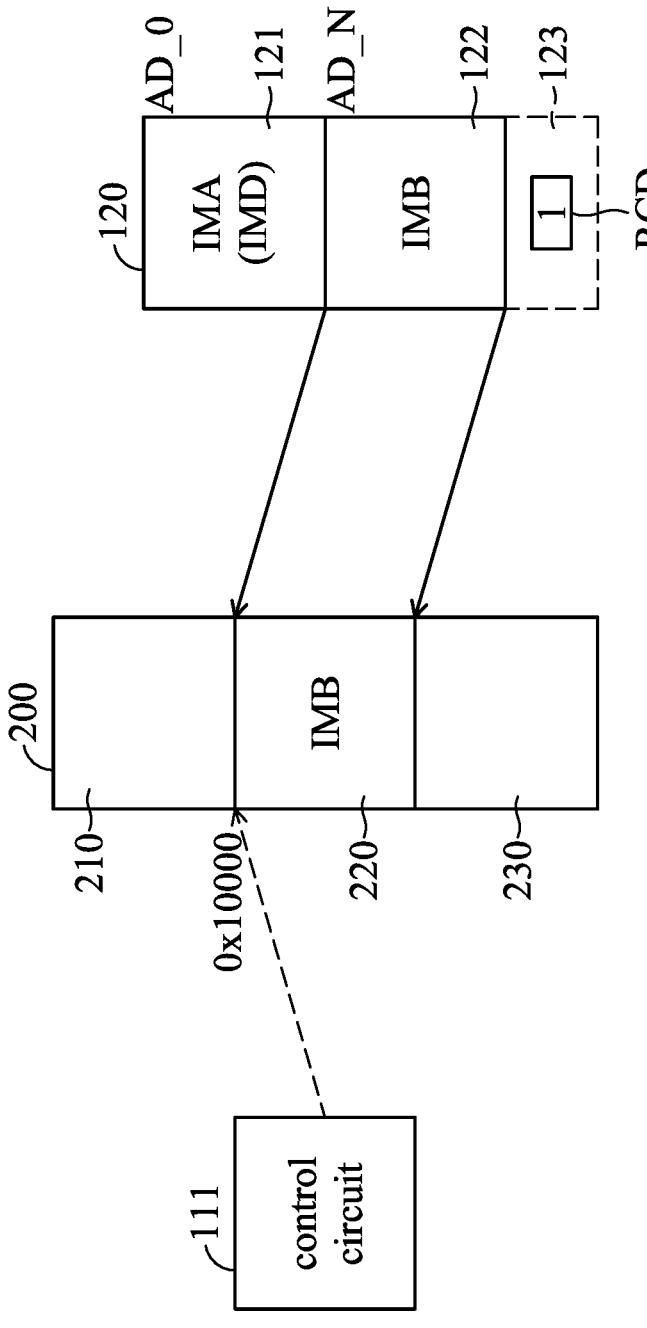

FIGS. 2A and 2B are schematic diagrams showing an exemplary embodiment of the system memory space. As shown in FIGS. 2A and 2B, the system memory space 200 comprises mapped memory spaces 210-230. The present invention does not intend to limit the number of mapped memory spaces. In other embodiments, the system memory space 200 comprises more mapped memory spaces. For convenience of description, it is assumed that the external memory 120 stores the recorded value RCD.

When the control circuit 111 wants to execute the program code of the mapped memory space 220, the control circuit 111 sends an access command. The management circuit 113 interprets the access command to obtain address information. When the address information points to the external memory 120, the management circuit 113 maps the program code IMA or IMB to the mapped memory space 220 according to the recorded value RCD. In a possible embodiment, the recorded value RCD points to a new-version program code.

In a possible embodiment, the case where the recorded value RCD matches a preset value (such as a value of 0) indicates that the program code IMA is a new-version F/W. Therefore, the management circuit 113 retrieves the program code IMA starting from the address AD_0 of the external memory 120. The management circuit 113 maps the program code IMA to the mapped memory space 220. Therefore, the control circuit 111 can execute the program code IMA starting from the start address 0x10000 of the mapped memory space 220.

In some embodiments, the control circuit 111 modifies the program code IMA of the mapped memory space 220 to generate a new program code IMC. The management circuit 113 writes the program code IMC back to the external memory 120 according to the recorded value RCD to replace the old-version F/W. For example, in FIG. 2A, since the recorded value RCD matches a preset value (such as a value of 0), the management circuit 113 writes the program code IMC back to the memory block 122 to replace the program code IMB. Since the start address of the memory block 122 is AD_N, the management circuit 113 writes the program code IMC to the memory block 122 starting from the address AD_N.

In other embodiments, the management circuit 113 downloads the new program code IMC in an over-the-air (OTA) manner. In this case, after the management circuit 113 downloads and verifies the new program code IMC, the management circuit 113 writes the new program code to the external memory 120 according to the recorded value RCD. For example, in FIG. 2A, since the recorded value RCD matches a preset value (such as a value of 0), the management circuit 113 replaces the program code IMB with the new program code IMC. The management circuit 113 writes the new program code to the memory block 122 starting from the address AD_N. In some embodiments, the management circuit 113 downloads the program code IMB in the OTA manner and stores the program code IMB in the memory block 122.

In FIG. 2B, since the recorded value RCD is 1 which does not match a preset value (such as a value of 0), the management circuit 113 retrieves the program code IMB starting from the address AD_N of the external memory 120.

In this example, the program code IMB is a new-version F/W, and the program code IMA is an old-version F/W. The management circuit 113 maps the program code IMB to the mapped memory space 220. The control circuit 111 executes the program code IMB starting from the start address 0x10000 of the mapped memory space 220.

In some embodiments, the control circuit 111 modifies the program code IMB in the mapped memory space 220 to generate a new program code IMD. The management circuit 113 writes the program code IMD back to the external memory 120 according to the recorded value RCD. For example, in FIG. 2B, the recorded value RCD is a value of 1 which does not match a preset value (such as a value of 0). Therefore, the management circuit 113 writes the program code IMD back to the memory block 121 of the external memory 120 to replace the program code IMA. In a possible implementation, the start address of the memory block 121 is AD_0. In this embodiment, the management circuit 113 writes the program code IMD to the memory block 121 starting from the address AD_0.

In other embodiments, the management circuit 113 downloads the new program code IMD in the OTA manner. In this case, the management circuit 113 writes the new program code IMD to the external memory 120 according to the recorded value RCD. For example, in FIG. 2B, since the recorded value RCD does not match the preset value, the management circuit 113 updates the program code IMA with the new program code IMD. In this example, the management circuit 113 writes the new program code to the memory block 121 starting from the address AD_0. In some embodiments, the management circuit 113 downloads the program code IMA in the OTA manner and stores the program code IMA in the memory block 121.

According to FIGS. 2A and 2B, the program code IMA at the address AD_0 of the external memory 120 and the program code IMB at the address AD_N of the external memory 120 are mapped to the same specific mapped memory space (such as the mapped memory space 220) so that the control circuit 111 executes different program codes from the same execution address (such as the address 0x10000), which can simplify the operation of the control circuit 111.

In a possible embodiment, after the management circuit 113 replaces the program code IMA with the new program code IMD, the management circuit 113 modifies the recorded value RCD so that the recorded value RCD matches the preset value. Therefore, when the control circuit 111 sends a new access command, the management circuit 113 maps the program code (such as the program code IMD) of the memory block 121 to the mapped memory space 220 because the recorded value RCD matches the preset value.

Similarly, please refer to FIG. 2A, after the management circuit 113 replaces the program code IMB with the new program code IMC, the management circuit 113 modifies the recorded value RCD so that the recorded value RCD does not match the preset value. Therefore, when the control circuit 111 sends a new access command, the management circuit 113 maps the program code (such as the program code IMC) of the memory block 121 to the mapped memory space 220 because the recorded value RCD does not match the preset value.

Figure 3:
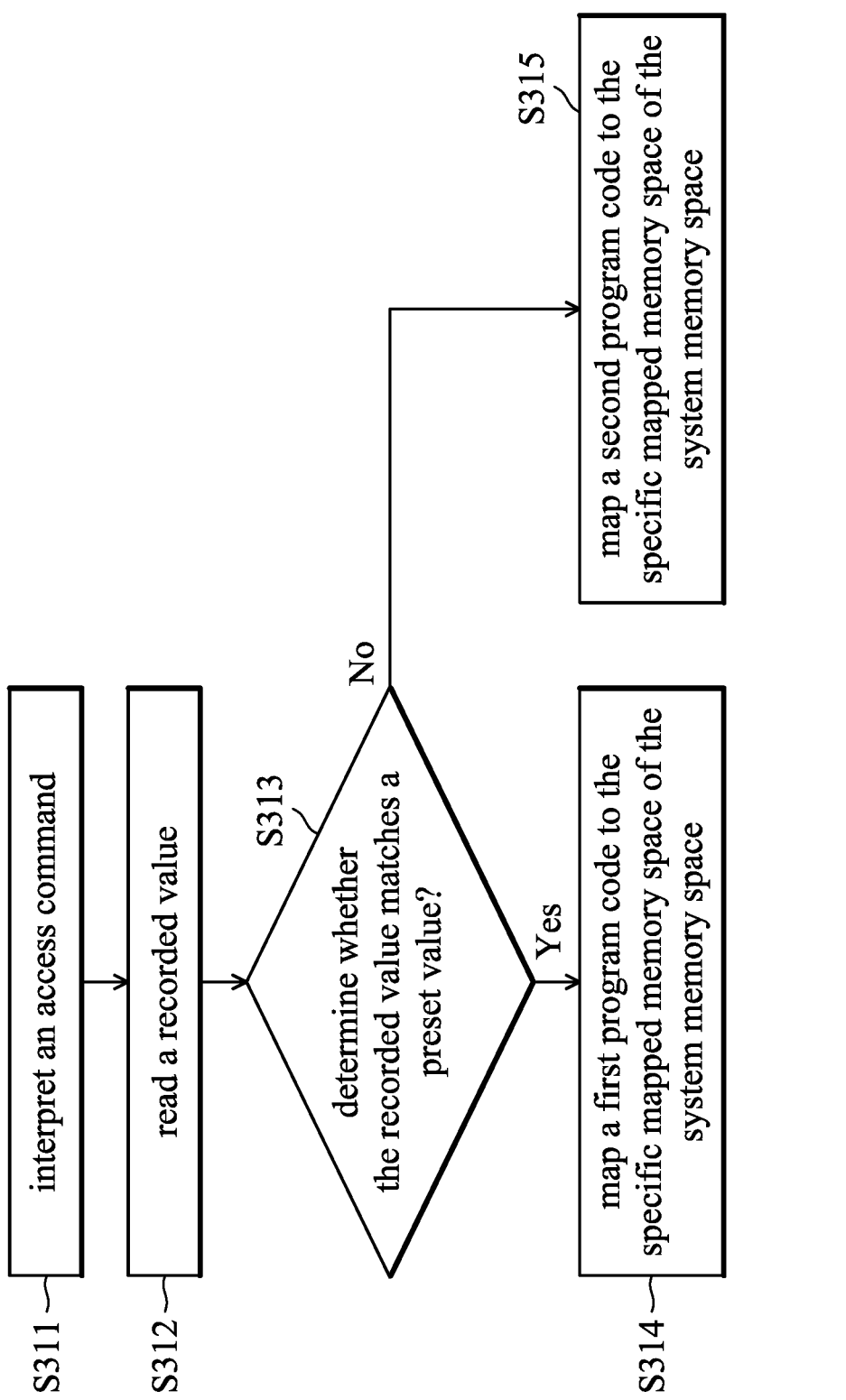
FIG. 3 is a flow chart of an exemplary embodiment of a management method.

FIG. 3 is a flow chart of an exemplary embodiment of a management method. The management method of the present invention is applied to a micro-controller to execute an over-the-air updated firmware. The micro-controller accesses an external memory. The external memory stores a first program code and a second program code. In a possible embodiment, the external memory system is implemented by a non-volatile memory. The management method of the present invention can be provided with program codes. When the program codes are loaded and executed by the machine, the machine becomes a micro-controller for implementing the present invention.

First, an access command is interpreted (Step S311), and a recorded value is read according to the access command (Step S312). In one possible embodiment, the recorded value is stored in a non-volatile memory. The present invention does not intend to limit the location of the non-volatile memory. The non-volatile memory may be located in the micro-controller. In another possible example, the recorded value is stored in the external memory.

Next, it is determined whether the recorded value matches a preset value (Step S313). When the recorded value matches the preset value, the external memory is accessed, and the first program code is mapped to a specific mapped memory space of a system memory space (Step S314). When the recorded value does not match the preset value, the external memory is accessed, and the second program code is mapped to the specific mapped memory space (Step S315).

After the first or second program code is mapped to the specific mapped memory space, a control circuit reads and executes the first or second program code starting from the start address (such as the address 0x10000 in FIG. 2A) of the specific mapped memory space. Since the control circuit executes different program codes from the same start address, the efficiency of the control circuit can be greatly improved.

In some embodiments, the control circuit modifies the program code in the specific mapped memory space. In this case, the program code stored in the specific mapped memory space may replace the first or second program code in the external memory. For example, in Step S313, when the recorded value matches the preset value, the first program code is mapped to the specific mapped memory space. In this example, after the program code in the specific mapped memory space is modified, the modified first program code replaces the second program code in the external memory. In addition, the recorded value is modified, and the modified recorded value does not match the preset value, for example, the recorded value is changed to the value of 1 from the value of 0. Similarly, in Step S313, when the recorded value does not match the preset value, the second program code is mapped to the specific mapped memory space. In this example, after the program code in the specific mapped memory space is modified, the modified second program code replaces the first program code in the external memory. In addition, the recorded value is modified, and the modified recorded value matches the preset value, for example, the recorded value is changed to the value of 0 from the value of 1.

In other embodiments, the micro-controller may download a third program code in an over-the-air (OTA) manner and replace the first or second program code with the third program code according to the recorded value. For example, when the recorded value matches the preset value, the micro-controller replaces the second program code with the third program code and modifies the recorded value so that the recorded value does not match the preset value. In another possible embodiment, when the recorded value does not match the preset value, the micro-controller replaces the first program code with the third program code and modifies the recorded value so that the recorded value matches the preset value.

In one possible embodiment, the second program code immediately follows the first program code. In this embodiment, the first and second program codes are stored in the same memory block. In another possible embodiment, the first and second program codes are respectively stored in a first memory block and a second memory block of the external memory. In this embodiment, the first and second memory blocks are continuous or discontinuous blocks. For example, there is at least one memory block between the first and second memory blocks.

It is assumed that the first and second program codes are respectively stored in the first memory block and the second memory block. The micro-controller may write a program code in the specific mapped memory space back to the first or second memory block. When the micro-controller writes the program code in the specific mapped memory space back to the first memory block, the program code in the specific mapped memory space replaces the first program code in the first memory block. When the micro-controller writes the program code in the specific mapped memory space back to the second memory block, the program code in the specific mapped memory space replaces the second program code in the second memory block. In this case, the micro-controller writes the program code in the specific mapped memory space back to the first memory block according to the recorded value. After the write operation is completed, the micro-controller changes the recorded value.

The present invention does not intend to limit how the micro-controller accesses the external memory. In one possible embodiment, the micro-controller accesses the external memory using a direct memory access technique. In other embodiments, the micro-controller comprises a cache for temporarily storing the first or the second program code. In this case, the cache may temporarily store a part of the first or second program code.

For example, the size of the cache is 1 KB. The contents of the cache are loaded from the external memory. The cache is fixed at a specific address (such as 0x10000) in the system memory space. In this example, the loader (such as the control circuit 111) sets the mapping of the cache according to the recorded value for executing the program code 1 or the program code 2 in the external memory. In a possible embodiment, a central processing unit (such as the control circuit 111) executes the program code at the address 0x10000. That is, the central processing unit executes the program in the cache, equivalently, the central processing unit executes the first 1 KB portion of the program code 1 in the external memory. Then, the central processing unit executes the program code at the address 0x10400. That is, the central processing unit executes the program in the cache, equivalently, the central processing unit executes the second 1 KB portion of the program code 1 in the external memory. Then, the central processing unit executes the program code at the address 0x10800. That is, the central processing unit executes the program in the cache, equivalently, the central processing unit executes the third 1 KB portion of the program code 1 in the external memory, until the program code 1 is executed completely.

In another possible embodiment, the loader sets the mapping of the cache according to the recorded value for executing the program code 2 in the external memory. In this embodiment, the central processing unit executes the program code at the address 0x10000. That is, the central processing unit executes the program in the cache, equivalently, the central processing unit executes the first 1 KB portion of the program code 2 in the external memory. Then, the central processing unit executes the program code at the address 0x10400. That is, the central processing unit executes the program in the cache, equivalently, the central processing unit executes the second 1 KB portion of the program code 2 in the external memory. Then, the central processing unit executes the program code at the address 0x10800. That is, the central processing unit executes the program in the cache, equivalently, the central processing unit executes the third 1 KB portion of the program code 2 in the external memory, until the program code 2 is executed completely.

In other embodiments, since the size of the cache is limited, such as 1 KB, when the start address of the program to be executed by the central processing unit exceeds the address range of the cache, for example, when the start address falls outside the 1 KB range, the cache automatically loads a new program code having a 1 KB range from the external memory, and then the central processing unit continues to execute the newly loaded program code in the cache. Therefore, the central processing unit can read the program code comprising the first to third 1 KB portions in the external memory.

In some embodiments, the size of the program code that is automatically loaded from the external memory by the cache is not necessarily equal to the size of the cache (for example, 1 KB). The size of the program code loaded from the external memory by the cache may be smaller than the size of the cache, which can reduce the time for the central processing unit to wait for the cache to be updated.

Furthermore, the micro-controller and the management method of the present invention do not use a position independent code/data technique. The micro-controller and the management method of the present invention map different program codes, which correspond to different start addresses (such as AD_0, AD_N) of the external mwmory 120, to the same address (such as 0x10000) of the same mapped memory space (such as the mapped memory space 220) of the system memory space 200. Regardless of which address the program code is stored in the external memory 120, the central processing unit (such as the control circuit 111) executes the F/W at the same address (such as 0x10000) of the system memory space 200, which can save costs of the compilation and management costs.

Even in a bare-metal system without an operating system or an operating system (OS) that does not support object code relocation, the micro-controller and the management method of the present invention can execute a F/W at a fixed address (such as 0x10000).

The management method of the present invention, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded to and executed by a machine such as a computer, the machine thereby becomes the micro-controller of the present invention for practicing the methods. The methods may also be embodied in the form of a program code transmitted over some transmission medium, such as electrical wiring or cabling, through fiber optics, or via any other form of transmission, wherein, when the program code is received and loaded to and executed by a machine such as a computer, the machine becomes the micro-controller of the present invention for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A micro-controller for executing on-the-air updated firmware, configured to access an external memory, the external memory storing a first program code and a second program code, and the micro-controller comprising:
  a bus;
  a control circuit sending an access command to the bus; and
  a management circuit receiving the access command through the bus and reading a recorded value,
  wherein:
  in response to that the recorded value matches a preset value, the management circuit maps the first program code to a specific mapped memory space of a system memory space;
  in response to that the recorded value does not match the preset value, the management circuit maps the second program code to the specific mapped memory space;
  in response to that the recorded value matches the preset value, the management circuit replaces the second program code with a third program code, and
  in response to that the recorded value does not match the preset value, the management circuit replaces the first program code with the third program code.

2. The micro-controller for executing on-the-air updated firmware as claimed in claim 1, wherein the recorded value is stored in the external memory.

3. The micro-controller for executing on-the-air updated firmware as claimed in claim 1, further comprising:
  a non-volatile memory storing the recorded value.

4. The micro-controller for executing on-the-air updated firmware as claimed in claim 1, wherein the control circuit modifies a third program code in the specific mapped memory space to generate a fourth program code, and the management circuit writes the fourth program code in the specific mapped memory space back to the external memory according to the recorded value.

5. The micro-controller for executing on-the-air updated firmware as claimed in claim 1, wherein:
  in response to that the recorded value does not match the preset value, the management circuit writes the third program code to a first memory block of the external memory to replace the first program in the first memory block code, and
  in response to that the recorded value matches the preset value, the management circuit writes the third program code to a second memory block of the external memory to replace the second program code in the second memory block.

6. The micro-controller for executing on-the-air updated firmware as claimed in claim 1, further comprising:
  a serial peripheral interface coupled between the management circuit and the external memory.

7. The micro-controller for executing on-the-air updated firmware as claimed in claim 1, wherein the management circuit accesses the external memory through a direct memory access technique.

8. The micro-controller for executing on-the-air updated firmware as claimed in claim 1, further comprising:
  a cache temporarily storing the first program code or the second program code.

9. A management method for executing over-the-air updated firmware, performed to access an external memory, the external memory storing a first program code and a second program code, the management method comprising:
  interpreting an access command;
  reading a recorded value according to the access command;
  in response to that the recorded value matches a preset value, mapping the first program code to a specific mapped memory space of a system memory space;
  in response to that the recorded value does not match the preset value, mapping the second program code to the specific mapped memory space; and
  downloading a third program code in an over-the-air manner; and
  replacing the first or second program code with the third program code according to the recorded value,
  wherein:
  in response to that the recorded value matches the preset value:
  the second program code is replaced with the third program code, and
  the recorded value is modified so that the recorded value does not match the preset value, and
  in response to that the recorded value does not match the preset value:
  the first program code is replaced with the third program code, and
  the recorded value is modified so that the recorded value matches the preset value.

10. The management method for executing over-the-air updated firmware as claimed in claim 9, further comprising:
  modifying the program code in the specific mapped memory space to generate a fourth program code; and
  writing the fourth program code in the specific mapped memory space back to the external memory according to the recorded value.

11. The management method for executing over-the-air updated firmware as claimed in claim 9, wherein:
  in response to that the recorded value does not match the preset value, the third program code is written to a first memory block of the external memory to replace the first program code in the first memory block, and in response to that the recorded value matches the preset value, the third program code is written to a second memory block of the external memory to replace the second program code in the second memory block.

12. The management method for executing over-the-air updated firmware as claimed in claim 9, further comprising:

accessing the external memory through a direct memory access technique.

13. The management method for executing over-the-air updated firmware as claimed in claim 9, further comprising:

writing the first program code or the second program code to a cache.

14. The management method for executing over-the-air updated firmware as claimed in claim 9, further comprising:

writing the recorded value to a non-volatile memory.

15. The management method for executing over-the-air updated firmware as claimed in claim 9, further comprising:

reading the first or the second program code from a start address of the system memory space.

* * * * *